Feb. 9, 1943.     J. O. GREER     2,310,735
EXCAVATOR
Filed March 17, 1942
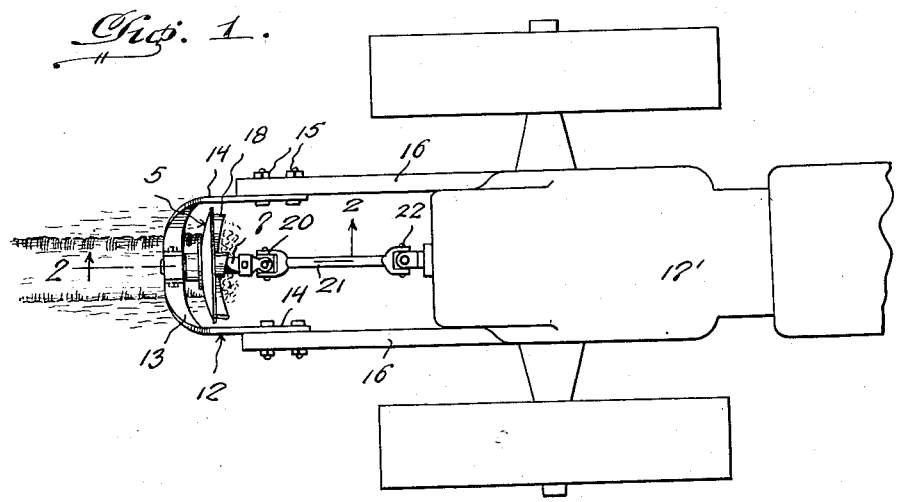
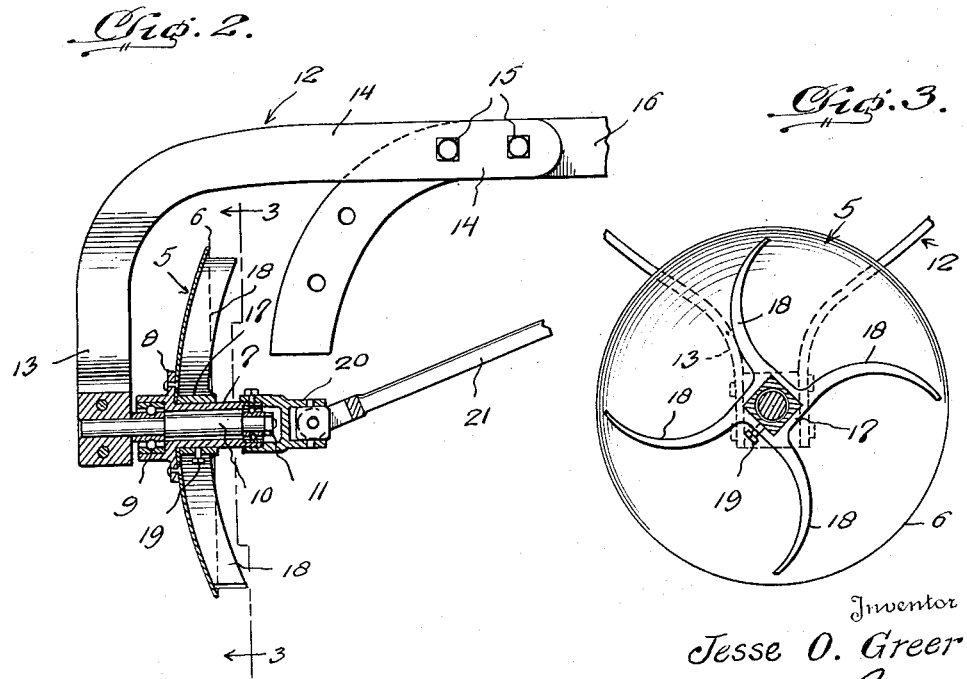
Inventor
Jesse O. Greer Patented Feb. 9, 1943

2,310,735

UNITED STATES PATENT OFFICE 2,310,735

EXCAVATOR

Jesse O. Greer, Robert Lee, Tex.

Application March 17, 1942, Serial No. 435,101

3 Claims. (Cl. 37—92)

This invention relates to an earth excavator for quickly and effectively cutting and removing earth and may be employed in ditch or trench construction and other excavation work.

The primary object of this invention is the provision of a device of the above stated character which may be easily and quickly installed on a tractor or similar device and powered therefrom, so that large quantities of earth may be rapidly cut and thrown for a considerable distance and will successfully operate by a minimum amount of power and may be readily sharpened when dull and repaired when damaged.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawing, in which Figure 1 is a top plan view illustrating an earth excavator constructed in accordance with my invention and showing the application thereof to a fragmentary portion of a tractor.

Figure 2 is a sectional view taken on the line 2—2 of Figure 1.

Figure 3 is a sectional view taken on the line 3—3 of Figure 2.

Referring in detail to the drawing, the numeral 5 indicates a concave cutting disc having a cutting edge 6 extending entirely about its periphery and is axially apertured to receive an elongated hub 7. The hub 7 has a flange 8 riveted or otherwise secured on the disc. The hub 7 is designed to receive anti-friction bearings 9 for rotatably mounting said hub on an axle 10 with a minimum amount of friction. The hub 7 is of elongated formation to extend distances beyond opposite faces of the disc. A nut 11 is employed for removably securing the hub 7 on the axle.

To support the axle a hanger 12 is provided and which includes a substantially V-shaped portion 13 and parallel connecting members 14 extending at substantially right angles to the V-shaped portion and are removably secured by bolts or like fasteners 15 to draw bars or members 16 extending rearwardly from a tractor 17'.

The connecting part of the V-shaped portion of the hanger 12 is equipped with a clamp or bearing to removably attach thereto the axle 10 and positions the axle to extend forwardly of the V-shaped portion and horizontally.

Mounted on the hub 7 is an auxiliary hub 17 equipped with radially arranged and arcuately curved blades 18, the free ends of which terminate inwardly of the cutting edge of the disc. The blades 18 are further curved to conform to the concave face of the cutting disc and abut said face.

The hub 7 is provided with angularly related faces and the auxiliary hub 17 is shaped to match said faces and is secured thereon by a set screw 19.

The forward end of the hub 7 has a universal joint 20 detachably connected thereto and the universal joint forms a part of a drive shaft 21. The shaft 21 is connected to a power take-off of the tractor by a universal joint 22.

By reference to Figures 1 and 2 it will be seen that the cutting disc and blades 18 are located rearwardly of the tractor for action in the soil or ground over which the tractor passes and is rotatably driven by power obtained from the tractor. The disc acts to cut the soil while the blades act to throw the cut soil for a considerable distance thereby providing an excavation which may be in the form of a trench or ditch, as clearly shown in Figure 1.

A device of the construction described installed on a tractor may be used for purposes other than that shown in Figure 1 as for instance it can be successfully employed for terracing, ditch closing or covering, etc.

While I have shown the disc and the blades as being driven by the power takeoff of the tractor through the use of a shaft and universal joints, other drive means can be employed as for instance sprocket gears and an endless sprocket chain.

While I have shown and described the preferred embodiment of my invention, it will be understood that minor changes in construction, combination and arrangement of parts may be made without departing from the spirit and scope of the invention as claimed.

Having described the invention, what I claim is:

1. In an excavator, a concave rotatable earth cutting disc having its periphery shaped to provide an annular cutting edge, means for mounting said disc for rotation at the rear end of a power driven means and at an angle to the line of draft of said power means, means for rotating said disc by power from said power means, and radially extending arcuately curved blades rotatable with the disc and contacting the concave face thereof and terminating short of the cutting edge for throwing earth from said disc as cut thereby.

2. In an excavator, a concave rotatable earth cutting disc having a peripheral cutting edge and an axially arranged opening, an elongated hub extending through the opening and secured to the disc and provided with angularly related faces, a shaft rotatably supporting the hub, a hanger supporting the shaft and connected to a power driven means, an auxiliary hub shaped to match the angularly related faces of the first hub, arcuately curved radially extending blades formed on the auxiliary hub and abutting the concave face of the disc and terminating short of the cutting edge, and means for delivering power from said power means to the first named hub for the rotation of the disc and blades.

3. In an excavator, a hanger including a substantially V-shaped portion and parallel attaching portions extending at substantially right angles to said V-shaped portion and adapted for mounting on a power driven means, a horizontally arranged shaft carried by the connecting part of the V-shaped portion of said hanger, a disc journaled on said shaft and having a peripheral cutting edge and a concave face, arcuately curved radially extending blades abutting the concaved face of the disc and curved to conform to said concave face and rotatable with the disc, and means for rotating the disc by power from said power means.

JESSE O. GREER.